United States Patent Office 3,376,197
Patented Apr. 2, 1968

3,376,197
ANABOLIC COMPOSITION COMPRISING
1,2β - METHYLENE - 5α - ANDROSTANE
DERIVATIVES
Hans Mueller and Friedmund Neumann, Berlin, and Rudolf Wiechert, Berlin-Wannsee, Germany, assignors to Schering Aktiengesellschaft, Berlin, Germany
No Drawing. Filed Apr. 26, 1966, Ser. No. 545,245
Claims priority, application Germany, Apr. 30, 1965,
Sch 36,965
14 Claims. (Cl. 167—74)

ABSTRACT OF THE DISCLOSURE 1,2β-methylene-5α-androstane derivatives, processes for their preparation, compositions containing the same and method for their use.

The above set forth derivatives are mainly 1,2β-methylene-5α-androstane derivatives of the formula

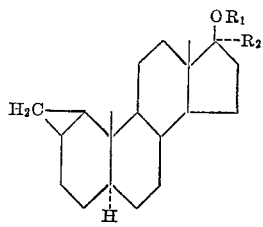

wherein $R_1$ is hydrogen or acyl and $R_2$ is hydrogen, alkyl, alkenyl, and alkinyl.

---

As acyl ($R_1$) there are suitable any and all of the acid groups conventional in steroid chemistry. Preferably $R_1$ designates an acid group containing from 1–11 carbon atoms, as for example acetic acid, propionic acid, capronic acid, enanthic acid, undecyl acid and the like. There are also suitable in this connection the acid groups which are substituted in the conventional manner. Instances of substituted acid groups include phenylacetic acid, cyclopentylpropionic acid, halocetic acid, aminoacetic acid, oxypropionacid, and the like.

As the $R_2$ substituent there come into question saturated and unsaturated hydrocarbon groups having 1 to 4 carbon atoms as for instance methyl, ethyl, butyl, ethinyl, vinyl, and the like.

The novel 1,2β-methylene-5α-androstane compounds in accordance with the invention constitute superior anabolic or central inhibiting agents and are for example superior ovulation inhibiting agents.

The subcutaneous anabolic and androgenic activity was measured by the standard methods in castrated male rats using the conventional levator-ani-seminal vesicle test procedures. As comparison substance there was employed the known anabolic agent 4-chlor-testosteroneacetate (I).

The anabolic superiority of the compounds of the invention is based not only on their improved anabolic activity but also in that they are associated with a significantly great dissociation between the main anabolic and the secondary androgenic effects. This is set out in Table I which follows. In the table, the compound 1,2β-methylene-5α-androstane-17β-ol (II) has been compared with 4-chlor-testosteroneacetate:

TABLE I

| Anabolic Substance, 12 x 3 mg., s.c. | Dose, mg./ Animal/Day | Levator ani, mg./100 g., Rat | Seminal vesicle, mg./100 g., Rat |
|---|---|---|---|
| I. 4-chlor-testosterone-acetate. | 3.0 | 40 | 113 |
| II. 1,2β-methylene-5α-androstane-17β-ol. | 3.0 | 44 | 47 |

Compared to the known anabolically active agents, the 1,2β-methylene steroids of the invention are characterized by a strong ovulation inhibiting activity. This is shown in Table II which follows, in which 1,2β-methylene-17α-methyl-5α-androstane-17β-ol (VII) of the invention is compared with the known ovulation inhibiting agents (III–VI). The test substances were administered orally to normal female rats and evaluated by the known tube inspection tests. The results of the tests are reported in terms of $WD_{50}$, that is, that dose level which completely inhibited ovulation in 50% of the test animals:

TABLE II

| Compound No. | Ovulation-Inhibiting Agent | $WD_{50}$ (mg./animal/day) [1] |
|---|---|---|
| III | 17α-ethinyl-19-nortestosterone | 3 |
| IV | 17α-ethinyl-19-nortestosteroneacetate | 3 |
| V | 17α-ethinyl-Δ⁵⁽¹⁰⁾-estren-17β-ol-3-one | 3–10 |
| VI | 6-chlor-Δ⁶-17α-hydroxyprogesteroneacetate. | 1–3 |
| VII | 1,2β-methylene-17α-methyl-5α-androstane-17β-ol | 0.1–0.3 |

[1] 4 day period.

From the table (Table II) it can be seen that the compound of the invention, i.e., 1,2β-methylene-17α-methyl-5α-androstane-17β-ol is at least 30 times stronger than the next strongest of the known ovulation inhibiting agents (III–VI).

The novel 1,2β-methylene-5α-androstane derivatives are administered as pharmaceuticals in various forms. When the oral route is indicated, they can be compounded in the form of tablets, dragées, capsules, pills, and the like. If they are to be administered parenterally, they are utilized in the form of their suspensions and solutions. The preparations may consist of the active ingredient, i.e., 1,2β-methylene-5α-androstane derivative per se but preferably are utilized together with the conventional carrier materials, fillers, colorants, taste improvers, and the like. The concentration of the 1,2β-methylene-5α-androstane derivative as adminstered is, of course, dependent on the underlying medical problem as is, of course, also the manner of adminstration. Thus, when the novel steroid is being utilized as anabolic agent, it is preferably employed in the form of its solution in oil and administered intramuscularly. In this form a dose of about 1–20 mg. is utilized. If the steroid is being used as an oral ovulation inhibiting agent, then preferably it is provided in tablet form, the tablets being compounded so as to contain 0.5–5 mg. per dosage unit.

The novel 1,2β-methylene-5α-androstane derivatives in accordance with the invention are prepared by treating compounds of the formula:

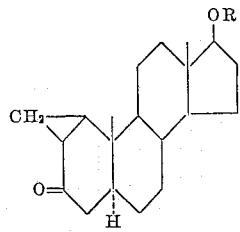

wherein R designates hydrogen or acyl as for instance an acetyl group in the conventional manner under reductive elimination of the 3-position oxygen atom and esterifying the primary product thereby recovered so as to produce the ultimately desired definition of $R_1$, using for the esterification the desired acid or a reactive derivative thereof or saponifying an acyloxy group and then re-esterifying the thus freed hydroxyl group, or in the case that $R_2$ is not hydrogen but represents alkyl, alkenyl or alkinyl, the 17β-hydroxyl group is converted in the known manner into the 17β-$OR_1$-17α-alkyl group.

The reductive elimination of the 3-position oxygen atom takes place in the known manner as for example by converting in the starting material, the 3-keto group into the 3-ethylenedithioketal group which is thereafter reduced for example with Raney-nickel in acetone or dioxan. Another possibility to eliminate the oxygen atom from the 3-keto group lies in using 3-tosylhydrazone with $LiAlH_4$ in tetrahydrofuran or $NaBH_4$ in methanol or dioxan. A preferred procedure consists in splitting of the 3-position carbonyl oxygen by the Wolff-Kishner reduction.

If as final product, it is desired to produce for example 17α-alkylated 1,2β-methylene-5α-androstane-17β-ol or its ester, the 17β-hydroxyl group can be subsequently converted into the desired 17α-alkyl-17β-hydroxyl group by oxidizing the 17β-hydroxyl group, for example according to the method of German Patent No. 1,117,573 and converting the resulting 17-keto group through Grignardization into the 17β-hydroxy-17-alkyl group or by reducing an analogously introduced 17α-alkinyl group to the corresponding alkenyl group or saturated alkyl group and depending on the desired definition of $R_1$, preferably carrying out a subsequent esterification of the primarily formed steroid alcohol with the desired acid or a reactive derivative thereof.

By the term "Grignardization" as used herein is meant not only the introduction of a saturated or unsaturated alkyl group by means of a corresponding alkyl magnesium halide but also the equivalent procedures as for instance the reaction of a keto group with lithium alkyl, as for example lithium methyl, in a suitable waterfree solvent; or with acetylene in liquid ammonia; or in tert. butyl or tert. amyl alcohol in the presence of an alkali metal, as for example potassium; or with lithium acetylide-ethylenediamine complex in a suitable waterfree solvent.

To illustrate the manner in which the invention may be carried out and as well the novel products produced thereby, the following examples are given. It is to be understood, however, that the examples are for the purposes of illustration, and the invention is not to be regarded as limited to any of the products, specific materials or conditions recited therein.

Example 1

5 g. 1,2β-methylene-5α - androstane-17β-ol-3-one-17-acetate, F. 214–215° C. (prepared by methylating $\Delta^1$-5α-androstene-3β, 17β-diol-17-acetate with methylene iodide and zinc-copper pair [J. Org. Chem., 24, 1825 (1959)] according to Simmons and Smith [J. Amer. Chem. Soc., 80, 5323 (58)], followed by oxidation of the resulting 1,2β-methylene-5α - antrostane-3β-17β-diol-17-acetate according to the known method using chromic acid in acetone) were heated for 20 minutes at 130° C. with 370 ml. ethylene-glycol and 25 ml. 80% hydrazone hydrate. The resulting mixture was then cooled down to about 80° C., 37 g. sodium hydroxide in 37 ml. water added and the mixture which formed heated for 2 hours at 190–200° C. under slow distillation.

Thereafter the reaction mixture was again cooled and poured into acidified sodium chloride. The precipitate which was formed was separated off by filtering and taken up in methylene chloride.

Following washing to neutrality, and drying, the methylene chloride solution was evaporated in vacuo. The residue was chromatographed using silica gel (5% water content) with methylene chloride/chloroform (1:1) and then crystallized out of diisopropyl ether. There were obtained 2.72 g. 1,2β-methylene-5α-androstane-17β-ol having a melting point of 140–140.5° C.

Example 2

1.5 g. 1,2β-methylene-5α-androstane-17β-ol were admixed with 3 ml. acetic acid anhydride and 10 ml. abs. pyridine and the resulting mixture allowed to stand overnight. The reaction mixture was then stirred into ice-cold sodium chloride solution. The precipitate which formed was filtered off, washed, and dried. Following crystallization from diisopropylether pentane, there were recovered 0.96 g. 1,2β-methylene-5α-androstane-17β-ol-17-acetate having a melting point of 118–118.5° C.

Example 3

2.5 g. 1,2β-methylene-5α-androstane-17β-ol, 5 ml. onanthic acid anhydride and 10 ml. abs. pyridine were heated together for 1.5 hours at 125° C. Thereafter 0.2 ml. of water were introduced and the heating continued for 1 hour at 100° C. The pyridine and excess onanthic acid anhydride were then distilled off with steam. The reaction product was extracted with methylene chloride. The methylene chloride phase was dried over sodium sulfate and evaporated. There were recovered 2.1 g. 1,2β-methylene-5α-androstane-17β-ol-17-onanthate in the form of an oil.

Example 4

2.72 g. 1,2β-methylene-5α-androstane-17β-ol were dissolved in 70 ml. acetone. There were then introduced into the solution, under stirring and in dropwise fashion, 0.65 g. chrom (VI) oxide in 2.5 ml. 8 N sulfuric acid, while cooling with ice-water. The reaction mixture was then poured into aqueous sodium chloride solution, filtered and the residue washed with water and taken up in methylene chloride. Following washing till neutrality, drying and evaporation of the methylene chloride phase, there were obtained 2.6 g. 1,2β-methylene-5α-androstane-17-one which when crystallized from diisopropylether melted at 98–99° C. Then into 4.0 g. 1,2β-methylene-5α-androstane-17-one in 40 ml. abs. benzene there were introduced in dropwise fashion a cooled Grignard solution prepared from 4.49 g. magnesium chips in 50 ml. abs. ether and 11.6 ml. methyl iodide in 32.4 ml. abs. ether and the resulting mixture stirred for 4 hours at room temperature. The reaction mixture was then cooled with ice, concentrated and aqueous ammonium chloride added to the concentrate. Thereafter the reaction mixture was made weakly acid with dilute hydrochloric acid and extracted with ether. The ether phase was separated off, washed until neutral and dried. Following evaporation and crystallization from diisopropylether, 3.14 g. 1,2β-methylene-17α-methyl-5α-androstane-17β-ol having a melting point of 129.5–130° C. were recovered.

Example 5

There were introduced under nitrogen into a 1 liter rotating autoclave 244 ml. tetrahydrofuran (distilled over lithium aluminum hydride), 5 g. potassium and 56.5 ml.

tert. butanol (distilled over sodium) and the autoclave sealed. The autoclave was rinsed with nitrogen until a pressure of 2 atm. nitrogen was reached and the autoclave allowed to rotate overnight. By the next day the potassium had been quantitatively reacted. The pressure was then released, restored to 2 atm. with nitrogen and acetylene introduced through a dip-tube until a total autoclave pressure of 5 atm. was obtained. The autoclave was then rotated for 4 to 6 hours. The pressure was released, the autoclave opened and after rinsing with nitrogen 7.2 g. 1,2β-methylene-5α-androstane-17-one in 53 ml. tetrahydrofuran (prepared as above) introduced. The autoclave was again sealed and as above brought to a pressure of 5 atm. with nitrogen and acetylene and rotated for 2 hours. After opening of the autoclave, the clear solution was removed and poured into 38 ml. 4 N sulfuric acid. The separated potassium salt was filtered off and the filtrate evaporated in vacuo. The strongly colorless crude product was taken up in methylene chloride, washed until the methylene chloride solution was neutral, dried, and evaporated. The residue was chromatographed, using silica gel (5% water content). Following elution with hexane/ acetic ester (9:1) and crystallization from pentane/diisopropylether there were obtained 5.75 g. 1,2β-methylene-17α-ethinyl-5α-androstane-17β-ol having a melting point of 113–114° C.

Example 6

A mixture of 1.4 g. 1,2β-methylene-17α-ethinyl-5α-androstane-17β-ol, 10 ml. pyridine and 10 ml. acetic acid anhydride were refluxed under sealing off of moisture. Following cooling, the reaction mixture was stirred into ice-cold sodium chloride solution, the precipitated material filtered off and washed with water. The precipitate was then taken up in methylene chloride which was dried over sodium sulfate and chromatographed over silica gel (5% water content). Following elution with hexane/benzene (1:2) and crystallization from pentane/diisopropylether, there were recovered 1.4 g. 1,2β-methylene-17α-ethinyl-5α-androstane-17β-ol-17-acetate having a melting point of 156.5–157.5° C.

Example 7

312 mg. 1,2β-methylene-17α-ethinyl-5α-androstane-17β-ol in 20 ml. pyridine were hydrogenated in the presence of 120 mg. 5% Pd/C as catalyst until 1 m. equivalent of hydrogen had been taken up. The catalyst was then separated off by filtering and the filtrate evaporated to dryness under vacuum. The residue was taken up in ether, the ether phase washed with 2 N sulfuric acid and water, dried over sodium sulfate and evaporated. There were recovered 300 mg. 1,2β-methylene-17α-vinyl-5α-androstane-17β-ol having a melting point of 109–110° C. (pentane).

Example 8

312 mg. 1,2β-methylene-17α-ethinyl-5α-androstane-17β-ol were hydrogenated in 45 ml. thiophene-free benzene in the presence of 300 mg. 5% Pd/C as catalyst until 2 m. equivalents of hydrogen had been consumed. The catalyst was then filtered off and the filtrate concentrate under vacuum. The residue consisted of 310 mg. 1,2β-methylene-17α-ethyl-5α-androstane-17β-ol having a melting point of 114.5–115.5° C. (diisopropylether/pentane).

Example 9

2 g. 1,2β-methylene-5α-androstane-17β-ol 4 ml. valeric acid anhydride and 8 ml. abs. pyridine were heated together for 4 hours at 125° C. The pyridine and excess valeric acid anhydride were removed by steam distillation. The reaction product was extracted with methylene chloride. The methylene chloride phase was dried over sodium sulfate and evaporated. There were recovered 1.5 g. 1,2β-methylene-5α-androstane-17β-ol-17-valerianate in the form of an oil.

When the example was carried out using in place of the valeric acid anhydride a specified higher homolog the corresponding 1,2β-methylene-5α-androstane derivative was obtained in a similar fashion.

What is claimed is as follows:

1. A compound selected from the group consisting of compounds of the formula

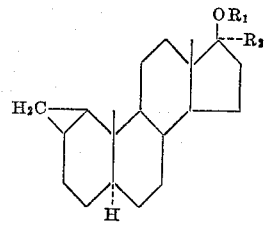

wherein $R_1$ is a member selected from the group consisting of hydrogen and acyl and $R_2$ is a member selected from the group consisting of hydrogen, alkyl, alkenyl, and alkinyl.

2. A compound according to claim 1 identified as 1,2β-methylene-5α-androstane-17β-ol.

3. A compound according to claim 1 identified as 1,2β-methylene-5α-androstane-17β-ol-17-acetate.

4. A compound according to claim 1 identified as 1,2β-methylene-5-α-androstane-17β-ol-17-enanthate.

5. A compound according to claim 1 identified as 1,2β-methylene-17α-methyl-5α-androstane-17β-ol.

6. A compound according to claim 1 identified as 1,2β-methylene-17α-ethinyl-5α-androstane-17β-ol.

7. A compound according to claim 1 identified as 1,2β-methylene-17α-vinyl-5α-androstane-17β-ol.

8. A compound according to claim 1 identified as 1,2β-methylene-17α-ethyl-5α-androstane-17β-ol.

9. A compound according to claim 1 identified as 1,2β-methylene-17α-ethinyl-5α-androstane-17β-ol-17-acetate.

10. 1,2β-methylene-5α-androstane-17-one.

11. A composition having anabolic and ovulation inhibiting activity comprising a compound according to claim 1 as active ingredient admixed with a carrier therefor.

12. A compostion according to claim 11 containing from 0.5 to 20 mg. of active ingredient.

13. The method of producing anabolic or central inhibiting activity in mammals, which comprises administering to a mammal a non-toxic but effective amount of a compound according to claim 1.

14. A compound according to claim 1 identified as 1,2β-methylene-5α-androstane-17β-ol-17 valerianate.

References Cited

UNITED STATES PATENTS 3,242,050  3/1966  Wiechert _____ 167—74

ELBERT L. ROBERTS, *Primary Examiner.*